United States Patent
Rheaume et al.

(10) Patent No.: US 11,872,424 B2
(45) Date of Patent: Jan. 16, 2024

(54) PROCESS WATER GAS MANAGEMENT OF ELECTROLYZER SYSTEM WITH MEMBRANE

(71) Applicant: Hamilton Sundstrand Corporation, Charlotte, NC (US)

(72) Inventors: Jonathan Rheaume, West Hartford, CT (US); Peter A T Cocks, South Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 884 days.

(21) Appl. No.: 16/593,834

(22) Filed: Oct. 4, 2019

(65) Prior Publication Data

US 2021/0101034 A1  Apr. 8, 2021

(51) Int. Cl.
| | | |
|---|---|---|
| *B01D 53/22* | (2006.01) | |
| *A62C 3/08* | (2006.01) | |
| *B01D 53/32* | (2006.01) | |
| *B01D 69/08* | (2006.01) | |
| *B64D 37/32* | (2006.01) | |
| *B64D 45/00* | (2006.01) | |

(52) U.S. Cl.
CPC .............. *A62C 3/08* (2013.01); *B01D 53/326* (2013.01); *B01D 69/08* (2013.01); *B01D 2257/104* (2013.01); *B01D 2313/243* (2013.01); *B64D 2037/325* (2013.01); *B64D 2045/009* (2013.01)

(58) Field of Classification Search
CPC .............. B01D 2257/104; B01D 69/08; B01D 53/326; B01D 2313/243; A62C 3/08; B64D 2037/325; B64D 2045/009
See application file for complete search history.

(56) References Cited

U.S. PATENT DOCUMENTS

| | | | | |
|---|---|---|---|---|
| 4,871,452 A | * | 10/1989 | Kohler | B64D 11/02 210/167.3 |
| 6,510,564 B1 | * | 1/2003 | Karlsson | B61D 35/007 4/431 |
| 8,685,576 B1 | | 4/2014 | Burke | |
| 9,174,740 B2 | | 11/2015 | Stolte et al. | |
| (Continued) | | | | |

OTHER PUBLICATIONS

Naim et al. "Recent Advances in Desalination Technologies: A Review." p. 1-77, researchgate, Apr. 2012 (Year: 2012).*

(Continued)

*Primary Examiner* — Anthony R Shumate
(74) *Attorney, Agent, or Firm* — CANTOR COLBURN LLP (57) ABSTRACT

A system and method fare disclosed for inerting a protected space. Process water is delivered to an anode of an electrochemical cell where a portion of the process water is electrolyzed to form protons and oxygen. The protons are transferred across the separator to the cathode, and process water is directed through a process water fluid flow path including a first side of a membrane. Gas is transferred to a second side of the membrane to form a de-gassed process water on the first side of the membrane, and the de-gassed process water is recycled to the anode. Air is delivered to the cathode and oxygen is reduced at the cathode to generate oxygen-depleted air. The oxygen-depleted air is directed from the cathode of the electrochemical cell along an inerting gas flow path to the protected space.

15 Claims, 7 Drawing Sheets

(56) References Cited

U.S. PATENT DOCUMENTS

| | | | |
|---|---|---|---|
| 9,623,981 | B2 | 4/2017 | Darling et al. |
| 9,963,792 | B2 | 5/2018 | Rheaume |
| 10,179,309 | B2 | 1/2019 | Rheaume et al. |
| 10,300,431 | B2 | 5/2019 | Rheaume et al. |
| 2005/0040131 | A1* | 2/2005 | Lin .................. B65D 55/16 215/254 |
| 2005/0254981 | A1* | 11/2005 | Liepert ............. F04C 23/001 418/5 |
| 2009/0267651 | A1 | 10/2009 | Maimone et al. |
| 2012/0090989 | A1 | 4/2012 | Haryu et al. |
| 2019/0001264 | A1 | 1/2019 | Rheaume et al. |
| 2020/0316523 | A1 | 10/2020 | Pess et al. |
| 2020/0318249 | A1 | 10/2020 | Rheaume |

OTHER PUBLICATIONS

EPO Official Letter for Application No. 19211887.5, dated Mar. 18, 2022, 4 page.

3M Liqui-Cel Membrane Contactors "A high level of consistency and control", 3M Company, May 2021, pp. 1-8.

Bhaumik et al., "Hollow fiber membrane degassing in ultrapure water and mircobiocontamination", Journal of Membrane Science, 2004, pp. 31-41.

EWT Water Technology "Membrane Degasser", pp. 1-2, retrieved Oct. 3, 2022, retrieved from the internet: https://www.ewt-wasser.de/en/product/membrane-degasser.html.

Extended European Search Report issued in Application No. 19211887.5 dated May 27, 2020, 8 pages.

\* cited by examiner

PROCESS WATER GAS MANAGEMENT OF ELECTROLYZER SYSTEM WITH MEMBRANE

BACKGROUND

The subject matter disclosed herein generally relates to systems for generating and providing inert gas, oxygen, and/or power on vehicles, and more specifically to gas management of such systems.

It is recognized that fuel vapors within fuel tanks become combustible or explosive in the presence of oxygen. An inerting system decreases the probability of combustion or explosion of flammable materials in a fuel tank by maintaining a chemically non-reactive or inert gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inert gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip vehicles (e.g., aircraft, military vehicles, etc.) with onboard inert gas generating systems, which supply nitrogen-enriched air to the vapor space (i.e., ullage) within the fuel tank. It is also known to store inert gas such as Halon onboard for fire suppression systems. In the case of nitrogen-enriched air, the nitrogen-enriched air has a substantially reduced oxygen content that reduces or eliminates oxidizing conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and nitrogen-enriched air (NEA) on the high-pressure side of the membrane. The requirement for a pressure differential necessitates a source of compressed or pressurized air. Another type of gas separator is based on an electrochemical cell such as a proton exchange membrane (PEM) electrochemical cell, which produces NEA by electrochemically generating protons for combination with oxygen to remove it from air.

BRIEF DESCRIPTION

A system is disclosed for providing inert gas to a protected space. The system includes an electrochemical cell comprising a cathode and an anode separated by a separator comprising a proton transfer medium. Also in the system, a power source is arranged to provide a voltage differential between the anode and the cathode. A cathode fluid flow path is in operative fluid communication with the cathode between a cathode fluid flow path inlet and a cathode fluid flow path outlet. An anode fluid flow path is in operative fluid communication with the anode, between an anode fluid flow path inlet and an anode fluid flow path outlet. A cathode supply fluid flow path is between an air source and the cathode fluid flow path inlet, and an inerting gas flow path is in operative fluid communication with the cathode fluid flow path outlet and the protected space. An anode supply fluid flow path is between a process water source and the anode fluid flow path inlet. A process water fluid flow path is in operative fluid communication with the anode fluid flow path inlet and the anode fluid flow path outlet. The system also includes a membrane including a first side in operative fluid communication with the process water fluid flow path and a second side in operative fluid communication with a first gas outlet.

Also disclosed is a method of inerting a protected space. According to the method, process water is delivered to an anode of an electrochemical cell comprising an anode and a cathode separated by a separator comprising a proton transfer medium. A portion the process water is electrolyzed at the anode to form protons and oxygen, and the protons are transferred across the separator to the cathode. Process water is directed through a process water fluid flow path including a first side of a membrane, and a gas is transferred from the process water fluid flow path on the first side of the membrane to a second side of the membrane to form a de-gassed process water on the first side of the membrane. The de-gassed process water is recycled to the anode. Air is delivered to the cathode and oxygen is reduced at the cathode to generate oxygen-depleted air. The oxygen-depleted air is directed from the cathode of the electrochemical cell along an inerting gas flow path to the protected space.

In some aspects, the method can further include transporting a sweep gas along the second side of the membrane.

In any one or combination of the foregoing aspects, the method can further include applying a pressure differential across the membrane with a lower pressure on the second side of the membrane compared to pressure on the first side of the membrane.

In any one or combination of the foregoing aspects, applying a pressure differential between the first and second sides of the membrane can include: providing the second side of the membrane with operative fluid communication with ambient air at an altitude greater than 10,000 feet above sea level to provide the pressure differential, or operating a vacuum pump on the second side of the membrane, or delivering a motive fluid to an ejector that includes a suction port in operative fluid communication with the second side of the membrane, or a combination including any of the foregoing.

In any one or combination of the foregoing aspects, the method can further include controlling the pressure differential between the first and second sides of the membrane to provide a target level of dissolved oxygen in the process water.

In any one or combination of the foregoing aspects, a fluid pressure on the second side of the membrane can be lower than a fluid pressure on the first side of the membrane.

In any one or combination of the foregoing aspects, a vacuum pump can be in operative fluid communication with the second side of the membrane.

In any one or combination of the foregoing aspects, the vacuum pump can be an oil-free vacuum pump.

In any one or combination of the foregoing aspects, the vacuum pump can be a diaphragm vacuum pump, a rocking piston vacuum pump, a scroll vacuum pump, a roots vacuum pump, a parallel screw vacuum pump, a claw type vacuum pump, or a rotary vane vacuum pump.

In any one or combination of the foregoing aspects, an ejector suction port can be in operative fluid communication with the second side of the membrane.

In any one or combination of the foregoing aspects, a pressure on the second side of the membrane can be provided by a fluid connection operable to provide fluid communication with ambient air at an altitude greater than 10,000 feet above sea level.

In any one or combination of the foregoing aspects, a sweep gas flow path can be on the second side of the membrane in operative fluid communication with a source of a sweep gas.

In any one or combination of the foregoing aspects, the membrane can include a micro-porous structure with pore or path sizes configured to be have greater permeability to gas molecules than to water molecules.

In any one or combination of the foregoing aspects, the membrane can include a polymer configured to have greater affinity with gas molecules than water molecules.

In any one or combination of the foregoing aspects, a liquid-gas separator can be on the process water fluid flow path, wherein the liquid-gas separator includes an inlet and a liquid outlet each in operative fluid communication with the process water fluid flow path, and a second gas outlet.

In any one or combination of the foregoing aspects, a heater or a first heat exchanger can be present and includes a heat absorption side in operative fluid communication with the process water fluid flow path.

In any one or combination of the foregoing aspects, a second heat exchanger can be present including a heat rejection side in operative fluid communication with the process water fluid flow path and a heat absorption side in operative thermal communication with a heat sink.

In any one or combination of the foregoing aspects, a plurality of the electrochemical cells can be in a stack separated by electrically-conductive fluid flow separators.

In any one or combination of the foregoing aspects, a sensor can be present configured to directly or indirectly measure dissolved oxygen content of process water that enters the gas-liquid separator, and a controller can be present and configured to provide a target response of the sensor through operation and control of fluid conditions at the membrane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may involve electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
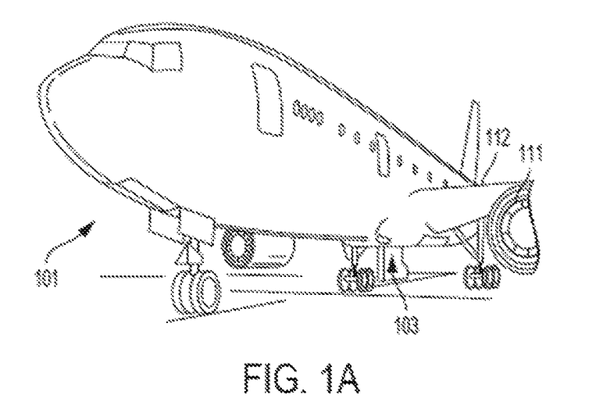
FIG. 1A is a schematic illustration of an aircraft that can incorporate various embodiments of the present disclosure.
Figure 1B:
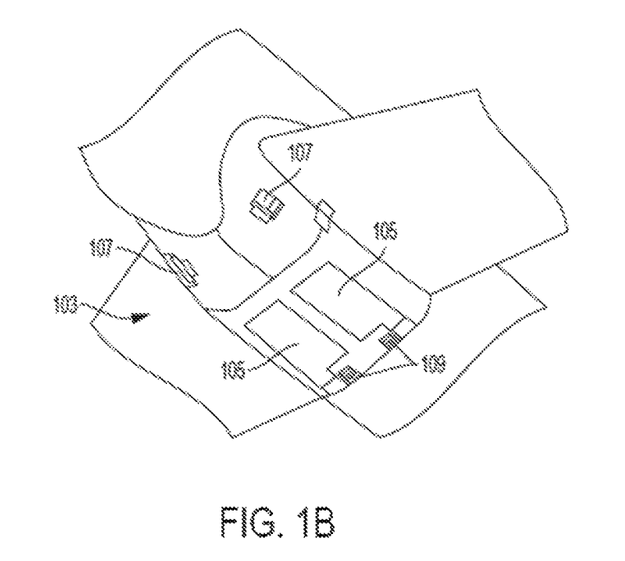
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inert gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
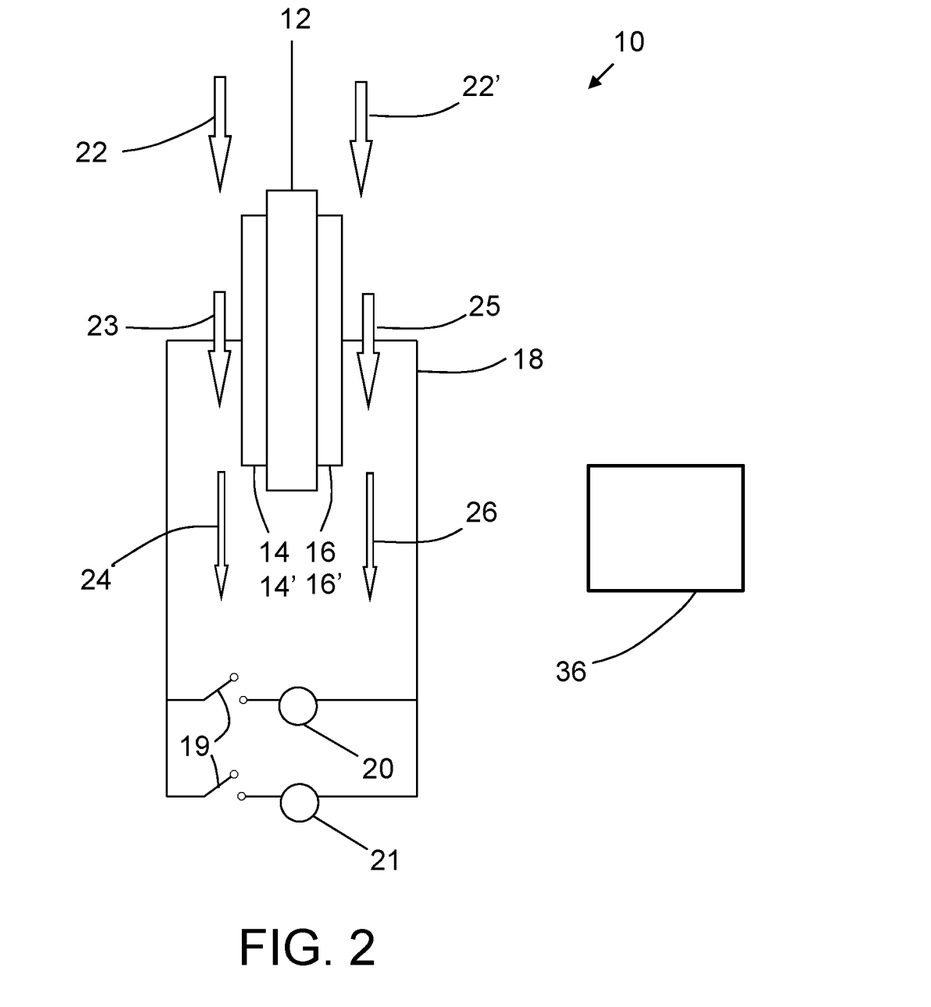
FIG. 2 is a schematic depiction an example embodiment of an electrochemical cell.

Referring now to FIG. 2, an electrochemical cell is schematically depicted. The electrochemical cell 10 comprises a separator 12 that includes an ion transfer medium. As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink 21. In some embodiments, the electric power system 20 can optionally include a connection to the electric power sink 21 (e.g., one or more electricity-consuming systems or components onboard the vehicle) with appropriate switching (e.g., switches 19), power conditioning, or power bus(es) for such on-board electricity-consuming systems or components, for optional operation in an alternative fuel cell mode.

With continued reference to FIG. 2, a cathode supply fluid flow path 22 directs gas from an air source (not shown) into contact with the cathode 14. Oxygen is electrochemically depleted from air along the cathode fluid flow path 23, and can be exhausted to the atmosphere or discharged as nitrogen-enriched air (NEA) (i.e., oxygen-depleted air, ODA) to a cathode fluid flow path outlet 24 leading to an inert gas flow path for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 includes water when the electrochemical cell is operated in an electrolytic mode to produce protons at the anode for proton transfer across the separator 12 (e.g., a proton transfer medium such as a proton exchange membrane (PEM) electrolyte or phosphoric acid electrolyte). If the system is configured for alternative operation in a fuel cell mode, the anode fluid flow path 25 can be configured to controllably also receive fuel (e.g., hydrogen). The protons formed at the anode are transported across the separator 12 to the cathode 14, leaving oxygen on the anode fluid flow path, which is exhausted through an anode fluid flow path outlet 26. The oxygen effluent may be entrained in process water in the form of bubbles or dissolved in the process water. Control of fluid flow along these flow paths can be provided through conduits and valves (not shown), which can be controlled by a controller 36 including a programmable or programmed microprocessor.

Exemplary materials from which the electrochemical proton transfer medium can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid electrolyzers and fuel cells.

During operation of a proton transfer electrochemical cell in the electrolytic mode, water at the anode undergoes an electrolysis reaction according to the formula:

$$H_2O \rightarrow \tfrac{1}{2}O_2 + 2H^+ + 2e^- \tag{1a}$$

$$3H_2O \rightarrow O_3 + 6H^+ + 6e^- \tag{1b}$$

By varying the voltage, the desired reaction 1a or 1b may be favored. For example, elevated cell voltage is known to promote ozone formation (reaction 1b). Since ozone is a form of oxygen, the term oxygen as used herein refers individually to either or collectively to both of diatomic oxygen and ozone.

The electrons produced by this reaction are drawn from electrical circuit 18 powered by electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula:

$$\tfrac{1}{2}O_2 + 2H^+ + 2e^- \rightarrow H_2O \tag{2}$$

Removal of oxygen from cathode flow path 23 produces nitrogen-enriched air exiting the region of the cathode 14. The oxygen and ozone evolved at the anode 16 by the reaction of formula (1) is discharged as anode fluid flow path outlet 26.

During operation of a proton transfer electrochemical cell in a fuel cell mode, fuel (e.g., hydrogen) at the anode undergoes an electrochemical oxidation according to the formula:

$$H_2 \rightarrow 2H^+ + 2e^- \tag{3}$$

The electrons produced by this reaction flow through electrical circuit 18 to provide electric power to the electric power sink 21. The hydrogen ions (i.e., protons) produced by this reaction migrate across the separator 12, where they react at the cathode 14 with oxygen in the cathode flow path 23 to produce water according to the formula (2): ($\frac{1}{2}O_2 + 2H^+ + 2e^- \rightarrow H_2O$), in which removal of oxygen from cathode flow path 23 produces nitrogen-enriched air exiting the region of the cathode 14.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice some amount of moisture will be removed through the cathode fluid flow path outlet 24 and/or the anode fluid flow path outlet 26 (either entrained or evaporated into the exiting gas streams). Accordingly, in some exemplary embodiments, water from a water source is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (e.g., through a water circulation loop, not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

Figure 3:
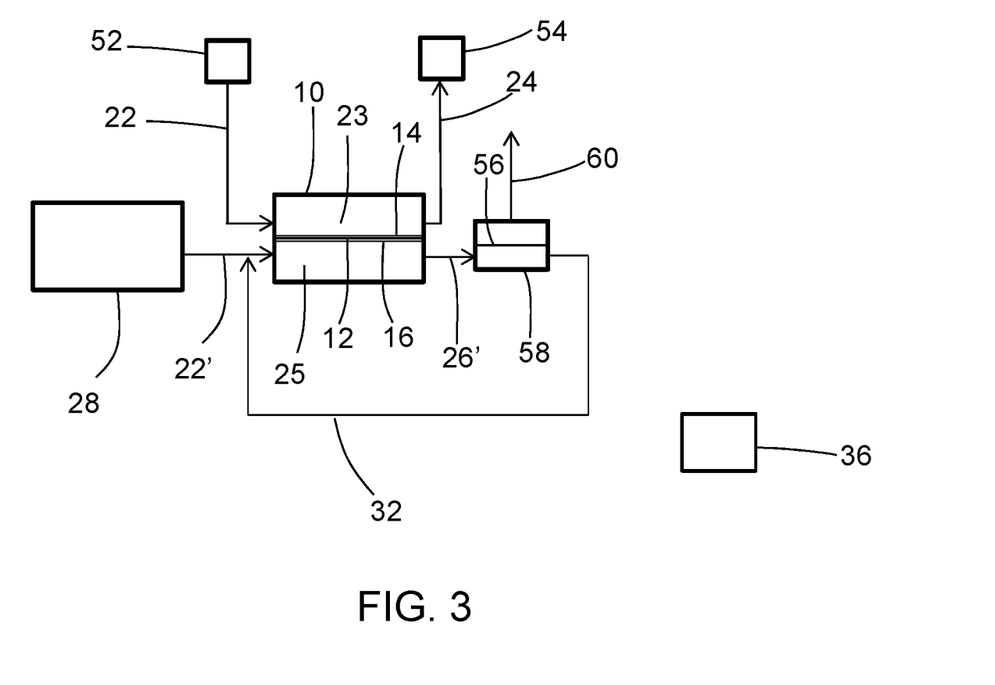
FIG. 3 is a schematic illustration of an example embodiment of an electrochemical inert gas generating system with a membrane separator.

An example embodiment of a protected space inerting system that can be used as an on-board aircraft inerting system with an electrochemical cell 10 is schematically shown in FIG. 3. As shown in FIG. 3, water from a process water source 28 is directed (e.g., by a pump, not shown) along the anode supply fluid flow path 22' to the anode fluid flow path 25, where it is electrolyzed at the anode 16 to form protons and oxygen. The protons are transported across the separator 12 to the cathode 14, where they combine with oxygen from airflow along the cathode fluid flow path 23 to form water. Removal of the protons from the anode fluid flow path 25 leaves oxygen on the anode fluid flow path in gas form and/or dissolved in the process water. As further shown in FIG. 3, the fluid flow path 26' includes a first side of membrane 56 housed in a membrane separator 58. Gas from the fluid flow path 26' is transported across the membrane 56 to a second side of the membrane that is in operative fluid communication with a gas outlet 60. Degassed water from the first side of the membrane 56 is returned to the electrochemical cell 10 through water return flow path 32, which is a part of the flow path 26'. Without removal, such gas(es) could accumulate in the system, and excess levels of gas(es) (including both gases dissolved in the liquid water and also in a gas phase) can cause problems such as pump cavitation or an equilibrium-based shift contrary to the electrolysis reaction(s) at the anode (see Le Chatelier's Principle).

Figure 4:
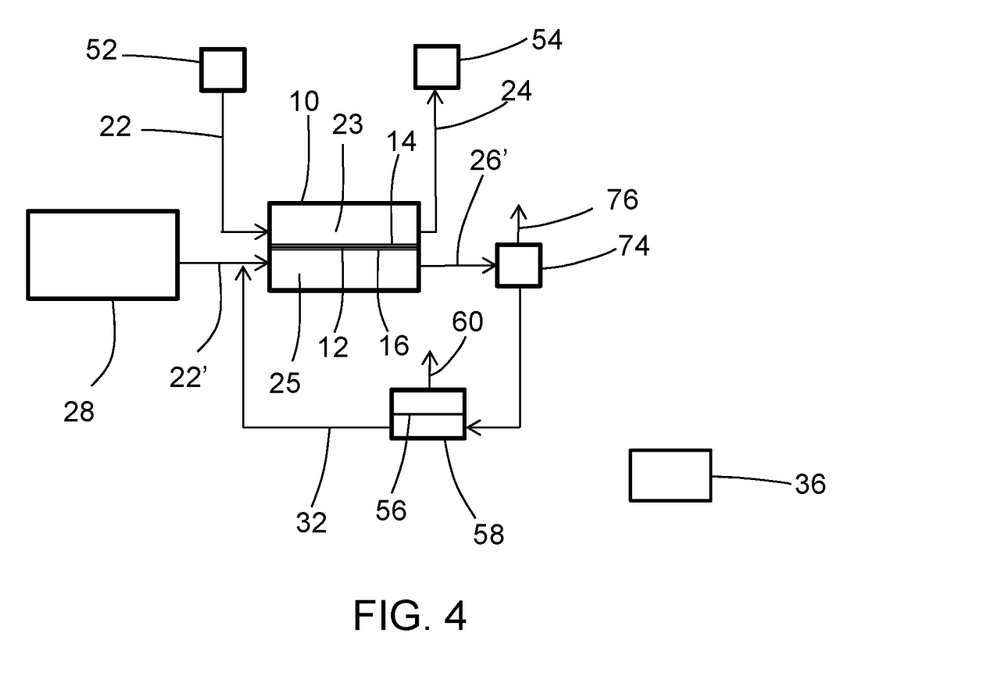
FIG. 4 is a schematic illustration of an example embodiment of an electrochemical inert gas generating system with a liquid-gas separator and a membrane separator.

In some aspects, such as shown in FIG. 4, the system can include a gas-liquid separator such as a vessel 74. The gas-liquid separator 58 can include a tank with a liquid space and a vapor space inside, allowing for entrained pockets of gas-phase gas to separate and accumulate in the vapor space for discharge through a gas outlet 76, and for liquid to be removed from the liquid space and transported to the membrane separator 58 for removal of dissolved gases as well as any remaining undissolved gases through the membrane 56. Additional aspects of gas-liquid separators can be found in U.S. patent application Ser. No. 16/375,659, the disclosure of which is incorporated herein by reference in its entirety. In some aspects, a vessel for gas-liquid separation vessel is not necessary, and the gas outlet 76 can be disposed on a fluid flow conduit at a high point on the flow path 26' where gas accumulates. It is noted here that FIGS. 4 and 6-9 show different variations of fuel tank inerting systems, and use some of the same reference numbers as FIG. 3. Such same numbers are used to describe the same components in FIGS. 4 and 6-9 as in FIG. 3, without the need for (or inclusion of) repeated descriptions of the components. For a description of the components identified by such same numbers, reference can be made to the description of FIG. 3 or other such previous Figure where the reference numbers were first introduced.

Various types of membrane materials can be used as the membrane 56. Examples of materials include hydrophobic polymers such as polyethylene or polypropylene that are formed into microporous structures that include tortious pathways through which gas molecules such as oxygen can be transported. The surface of the membrane can also be physically contoured to or chemically treated to promote hydrophobicity. The combination of available pathways for gas molecules through the membrane plus the lower affinity of the hydrophobic polymer for water molecules compared to gas molecules such as oxygen provides the membrane with selectivity for gas molecules such as oxygen compared to water. Surface treatments can be provided for various features besides promoting hydrophobicity, such as protection against aggressive agents (e.g., trace oxidative agents in water) or anti-fouling. For example, a porous coating of perfluorodimethyldioxole-tetrafluoroethylene can be applied to the membrane as a protectant.

Figure 5:
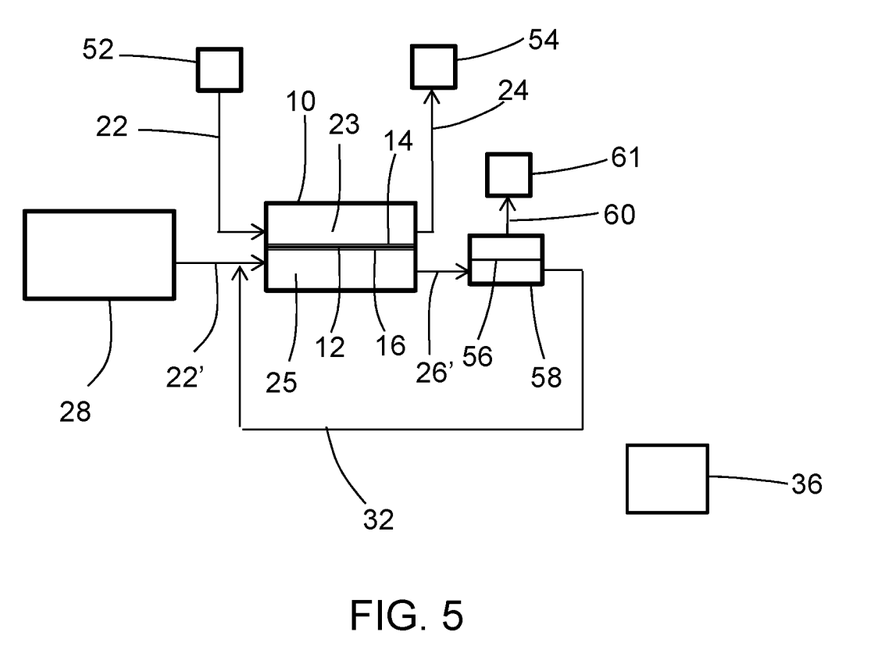
FIG. 5 is a schematic illustration of an example embodiment of an electrochemical inert gas generating system with a membrane separator and a gas outlet to a gas discharge space.

In some aspects, removal of gas across the membrane 56 can be promoted by a pressure differential between a fluid pressure on the flow path 26' and a space 61 to which gas from the gas outlet 60 is discharged (i.e., a gas discharge space 61) as shown in FIG. 5. In some aspects, the pressure differential can be in a range with a lower end of 1 psi, or 2 psi, or 3 psi, and an upper end of 50 psi, or 75 psi, or 100 psi. These range endpoints can be independently combined to provide a number of different ranges, and each possible range produced by combinations of these endpoints is hereby expressly disclosed. In some aspects, the pressure differential between the flow path 26' and the gas discharge space 61 can be provided with a reduced pressure in the gas discharge space 61 such as a pressure less than atmospheric pressure at sea level. In some aspects, a pressure in the gas discharge space 61 can be in a range with a lower end of 5 torr, or 10 torr, or 20 torr, and an upper end of 3 psi, or 5 psi, or 10 psi. These range endpoints can be independently combined to provide a number of different ranges, and each possible range produced by combinations of these endpoints is hereby expressly disclosed. In some aspects where the system is deployed onboard an aircraft, a reduced pressure in the gas discharge space 61 can be provided by controlling valves and other system components to discharge gas from the gas from the gas outlet 60 to atmosphere (including optionally disengaging one or more pressure control devices such as a vacuum pump or ejector) when the aircraft is at an altitude to provide an outside atmosphere at a predetermined pressure such as a pressure within any of the above-disclosed pressure ranges for a gas discharge space. For example, air pressure is about 10.1 psi at 10,000 feet, and operation of the system at that altitude or higher would provide a gas discharge space at a pressure of 10.1 psi or lower.

In aspects where the system is deployed other than onboard an aircraft, or onboard an aircraft that is not at altitude (e.g., altitudes of less than 10,000 feet above sea level), or when the aircraft is at altitudes of at least 10,000 feet above sea level but a greater pressure differential is desired, a vacuum source can be used to provide a reduced pressure in the gas discharge space 61.

Figure 6:
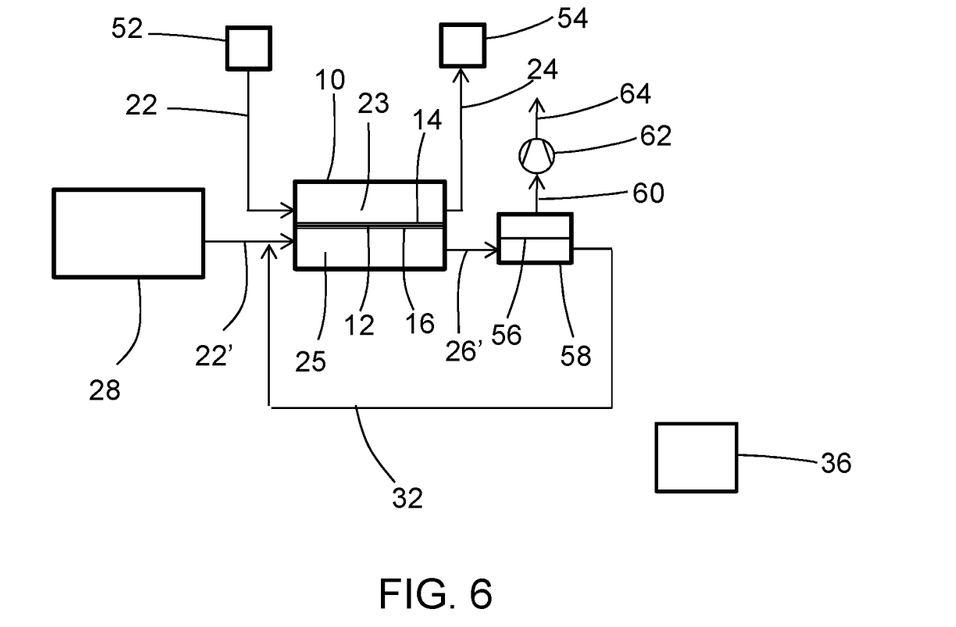
FIG. 6 is a schematic illustration of an example embodiment of an electrochemical inert gas generating system with a membrane separator and a vacuum pump.

For example, FIG. 6 shows a vacuum pump 62 in operative fluid communication with the second side of the membrane 56 to provide a reduced pressure. The vacuum pump discharges gas through a discharge outlet 64. Various types of vacuum pumps can be used as the vacuum pump 62. For example, rotary vane vacuum pumps may be used, but tend to be heavy and require regular maintenance (oil changes) due to operating fluids such as oil, which can contaminate the process water and adversely impact the electrochemical cell 10. Accordingly, in some aspects, an operating fluid-free vacuum pump is used. In various aspects, an operating fluid-free vacuum pump can be at least one of a diaphragm vacuum pump, a rocking piston vacuum pump, a scroll vacuum pump, a roots vacuum pump, a parallel screw vacuum pump, a claw type vacuum pump, or a rotary vane vacuum pump. The vacuum pump 62 can be driven by various power sources, including but not limited an electric motor drive, a mechanical power transfer mechanism such as a shaft, belt or gear(s) coupled to a source of mechanical power such as an onboard turbine, or a hydraulic motor or a pneumatic motor coupled to a source of compressed fluid. Although only a single vacuum pump 62 is shown in FIG. 6, banks of vacuum pumps arranged in series or in parallel can be used. Further description of vacuum pumps and their arrangements in series or parallel can be found in U.S. patent application publication no. US 2018/0318730 A1, the disclosure of which is incorporated herein by reference in its entirety.

Figure 7:
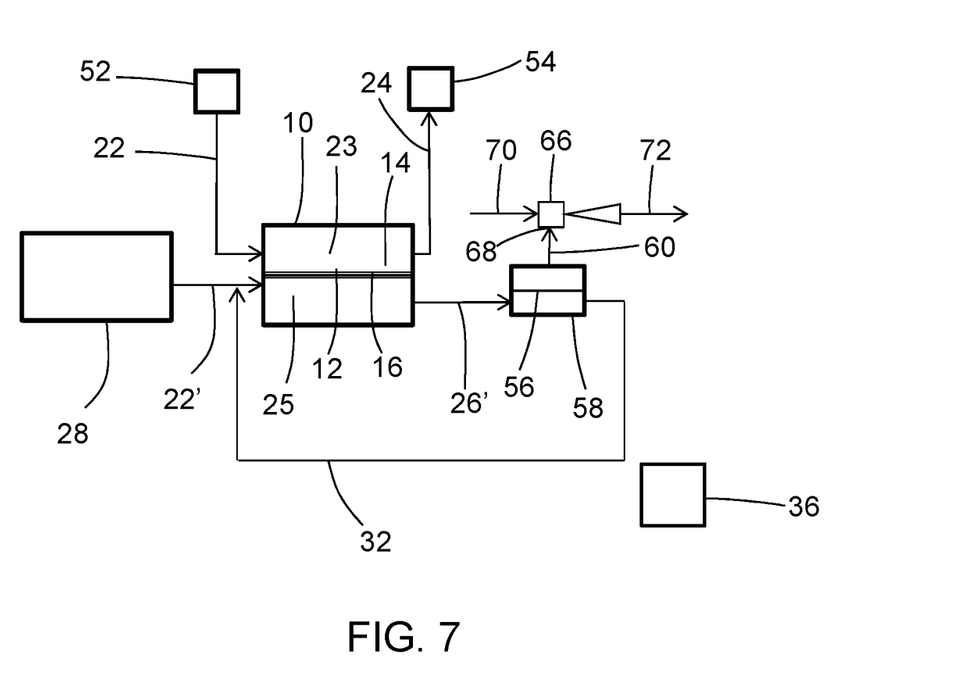
FIG. 7 is a schematic illustration of another example embodiment of an electrochemical inert gas generating system with a membrane separator and an ejector.

In another aspect, shown in FIG. 7, an ejector 66 is in operative fluid communication with the second side of the membrane 56 provide a reduced pressure. As shown in FIG. 7, the ejector 66 includes suction port 68 that receives a suction fluid (in this case, discharge from the gas outlet 60), a motive fluid port 70 that receives a motive fluid (e.g., compressed air such as bleed air from a compressor section of a gas turbine engine or from another compressor), and a discharge port 72 that discharges the combined fluids from the suction port 68 and the motive fluid port 70. The motive fluid and the suction fluid 66 enter a mixing section, with the motive fluid acting to provide suction to draw in the suction fluid according to the Bernoulli principle. The mixed fluids are discharged from the ejector 66 through discharge port 72. In some aspects, the ejector 66 can have a fixed cross-section throat, which can be sized to act as a non-critical (i.e., subsonic) ejector with a relatively open throat area to create a deep vacuum, or can be sized to act as a critical (i.e., sonic choke) ejector with a relatively restricted throat area for high secondary flow. In other aspects, the ejector 66 can provide a controllably variable throat area to accommodate different operating conditions (e.g., varying levels of oxygen concentration in the process water on the flow path 26'). Although only a single ejector 66 is shown in FIG. 6, banks of ejectors arranged in series or in parallel can be used. Further description of ejectors and their arrangements in series or parallel can be found in U.S. patent application Ser. No. 15/925,405, the disclosure of which is incorporated herein by reference in its entirety.

Figure 8:
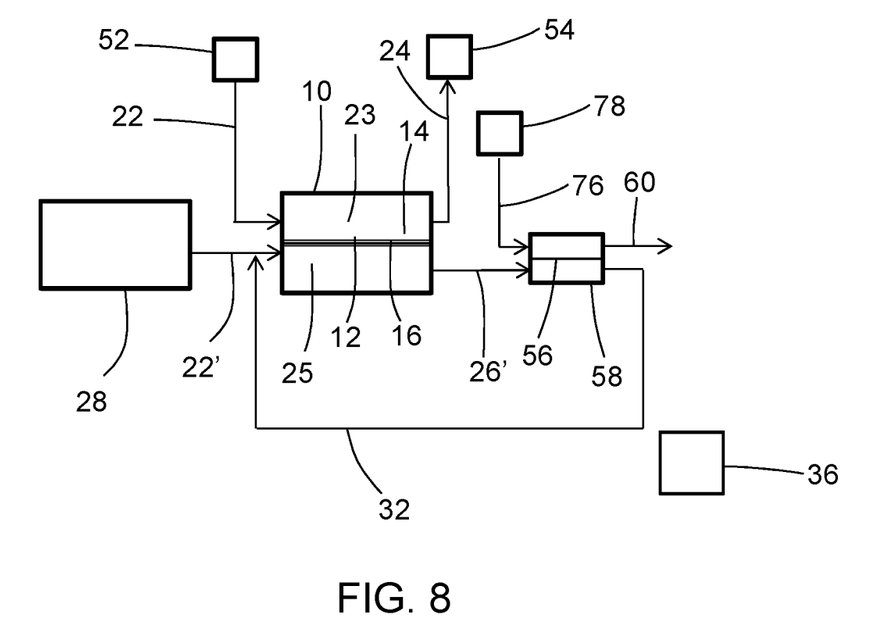
FIG. 8 is a schematic illustration of another example embodiment of an electrochemical inert gas generating system with a membrane separator and a sweep gas.

In another aspect, shown in FIG. 8, a sweep gas 76 from a sweep gas source 78 can be provided to such as an air source (e.g., ram, compressor bleed, or ECS conditioned air) or an inert gas source such as nitrogen gas or ODA from an inert gas flow path, which can be supplied by the cathode fluid flow path outlet 24 or another ODA source. The sweep gas should have a lower concentration of gas component(s) being removed from the liquid compared to a concentration that the component(s) would have in a gas at equilibrium with the process water on the flow path 26'. The difference in equilibrium concentrations of the component(s) provides a physiochemical potential that drives the gas components across the membrane 56 as the system seeks to establish equilibrium. In the case of circulating process water with accumulated oxygen produced at the anode 16, air or ODA may have a sufficiently low concentration of oxygen to function as a sweep gas 76. A sweep gas can be used as the sole motive force promoting gas transport across the membrane 56 or can be used in combination with a vacuum source, with a sweep gas source 78 upstream of the membrane 56 and a vacuum source or other low-pressure discharge space downstream of the membrane 56.

In some aspects of the disclosure, oxygen from the gas outlet 60 can be exhausted to atmosphere or can be used for other applications such as an oxygen stream directed to aircraft occupant areas, occupant breathing devices, an oxygen storage tank, or an emergency aircraft oxygen breathing system. In some aspects, ozone from gas outlet 60 can be exhausted to a fuel tank or to a water tank to prevent biofilm formation. Ozone in contact with water can provide a technical effect of promoting disinfecting by killing microbes that may be present in a water tank, for example from being filled with water from an unsanitary source. Additional components promoting the separation of gas from liquid on the flow path 26' such as coalescing filters, vortex gas-liquid separators, membrane separators, heaters, heat exchangers, etc. can also be utilized as described in further detail below or in U.S. patent application Ser. No. 16/375,659, the disclosure of which is incorporated herein by reference in its entirety. Other components and functions can also be incorporated with the flow path 26', including but not limited to water purifiers such as disclosed U.S. patent application Ser. No. 16/374,913, the disclosure of which is incorporated herein by reference in its entirety.

With continuing reference to FIGS. 3-8, the electrochemical cell or cell stack 10 generates an inert gas on the cathode fluid flow path 23 by depleting oxygen to produce oxygen-depleted air (ODA), also known as nitrogen-enriched air (NEA) at the cathode 14 that can be directed to a protected space 54 (e.g., a fuel tank ullage space, a cargo hold, or an equipment bay). As shown, an air source 52 (e.g., ram air, compressor bleed, blower) is directed to the cathode fluid flow path 23 where oxygen is depleted by electrochemical reactions with protons that have crossed the separator 12 as well as electrons from an external circuit (not shown) to form water at the cathode 14. The ODA thereby produced can be directed to a protected space 54 such as an ullage space in in the aircraft fuel tanks as disclosed or other protected space 54. The inert gas flow path (cathode fluid flow path outlet 24) can include additional components (not shown) such as flow control valve(s), a pressure regulator or other pressure control device, and water removal device(s) such as a heat exchanger condenser, a membrane drier or other water removal device(s), or a filter or other particulate or contaminant removal devices. Additional information regarding the electrochemical production of ODA can be found in U.S. Pat. Nos. 9,963,792, 10,312,536, and U.S.

patent application Ser. No. 16/029,024, the disclosures of each of which are incorporated herein by reference in their entirety.

In some embodiments, the electrochemical cell can be used in an alternate mode to provide electric power for on-board power-consuming systems, as disclosed in the above-referenced U.S. Pat. No. 10,312,536. In this mode, fuel (e.g., hydrogen) is directed from a fuel source to the anode 16 where hydrogen molecules are split to form protons that are transported across the separator 12 to combine with oxygen at the cathode. Simultaneously, reduction and oxidation reactions exchange electrons at the electrodes, thereby producing electricity in an external circuit. Embodiments in which these alternate modes of operation can be utilized include, for example, operating the system in alternate modes selected from a plurality of modes including a first mode of water electrolysis (either continuously or at intervals) under normal aircraft operating conditions (e.g., in which an engine-mounted generator provides electrical power) and a second mode of electrochemical electricity production (e.g., in response to a demand for emergency electrical power such as due to failure of an engine-mounted generator). ODA can be produced at the cathode 14 in each of these alternate modes of operation.

In some aspects, the gas inerting system can promote gas(es) dissolved in the process water (e.g., oxygen) to evolve gas in the gas phase that can be removed from the process water fluid flow path 26' through the gas outlet 60. The solubility of gases such as oxygen in water varies inversely with temperature and varies directly with pressure. Accordingly, higher temperatures can provide lower solubility of oxygen in water, and lower temperatures provide greater solubility of oxygen in water. Similarly, reduced pressures provide lower solubility of oxygen in water. In some embodiments, the systems described herein can be configured to promote evolution of gas(es) from dissolved gas(es) in the process water through thermal control and/or pressure control for removal from the process water fluid flow path. Thermal and pressure management is provided as discussed in more detail below.

Figure 9:
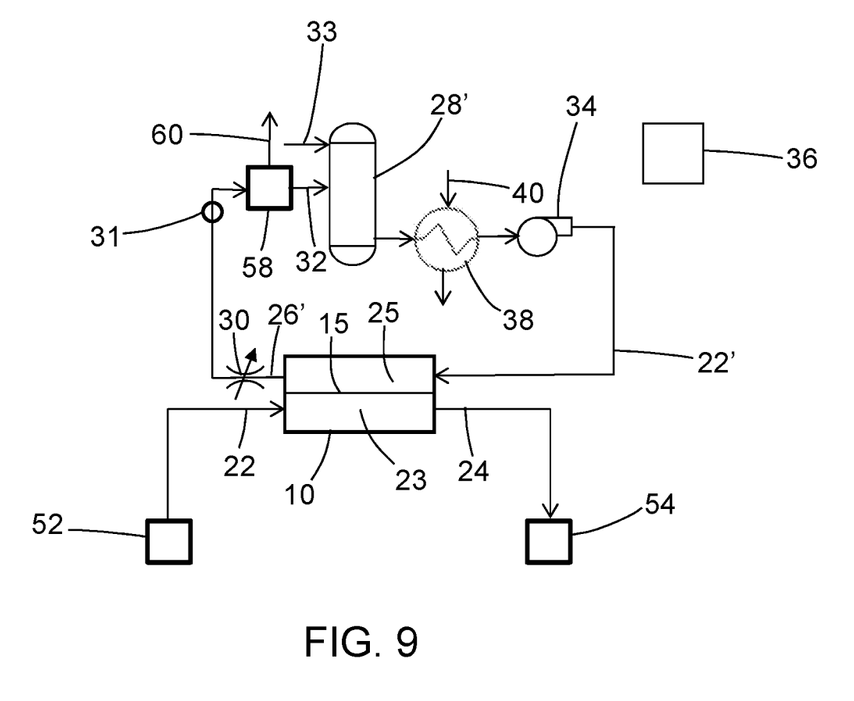
FIG. 9 is a schematic illustration of an example embodiment of another electrochemical inert gas generating system.
Figure 10:
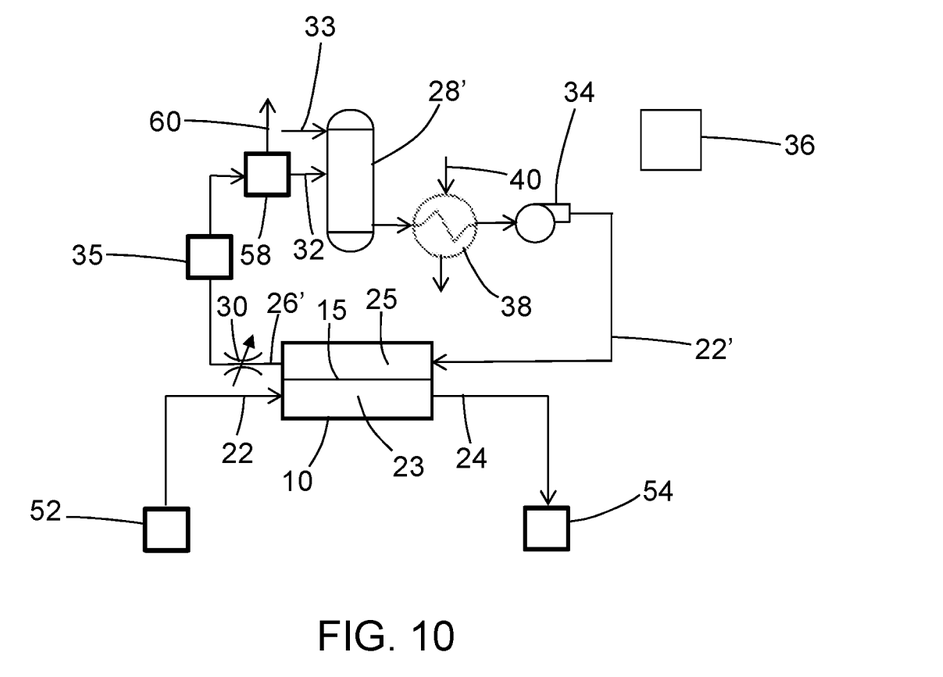
FIG. 10 is a schematic illustration of an example embodiment of yet another electrochemical inert gas generating system.

With reference now to FIG. 9, an example embodiment is shown of a gas inerting system utilizing an electrochemical cell or stack 10 and thermal and/or pressure management. As shown in FIG. 9, the cathode side of the electrochemical cell or stack 10 produces ODA on the cathode fluid flow path 23 as inert gas for a protected space in the same manner as discussed above with respect to FIGS. 3, 5, and 6. Also, for ease of illustration, the separator 12, cathode 14, and anode 16 are shown as a single membrane electrode assembly (MEA) 15. It is noted that FIGS. 9-10 show counter-flow between the anode and cathode sides of the MEA 15, whereas FIGS. 3-8 show co-flow; however, many configurations can utilize cross-flow configurations that are not shown in the Figures herein for ease of illustration. It is further noted that, although not shown in the Figures, process water for thermal management can also be in fluid and thermal communication with the cathode side of the electrochemical cell 10 as will be understood by the skilled person. On the anode side of the electrochemical cell 10, process water from the water source (e.g. a water reservoir 28' equipped with a process make-up water feed line 33) is directed along the anode supply fluid flow path 22' by a pump 34. The pump 34 provides a motive force to move the process water along the anode fluid flow path 25, from which it is directed through flow control valve 30 to a gas-liquid separator 58. Oxygen or other gases on the process water fluid flow path can be removed through a gas outlet 60 from the vessel 58 to gas discharge space 56, or the water reservoir 28' can itself serve as a gas-liquid separator by providing a sufficiently large volume for reduced flow velocity and a vapor space for gas-liquid separation and a gas outlet (not shown) to the gas discharge space 56.

As mentioned above, in some embodiments the controller 36 can control system operating parameters to provide a target dissolved gas content (e.g., a dissolved oxygen content) in the process water during operation. Dissolved oxygen concentration in the process water can be measured directly. Examples of oxygen sensors include (i.e., an oxygen sensor calibrated to determine dissolved oxygen content), but are not limited to sensors that utilize the measurement of variables such as impedance, spectral transmittance/absorbance of light, chemical reactivity of analytes with dissolved oxygen, electrochemical sensors (including the anode and cathode of the electrochemical cell/stack 10 and spot measurements thereon), chemical interactions, or combinations (e.g., chemiluminescent sensors). Dissolved oxygen levels can also be determined without a sensor calibrated directly for dissolved oxygen. For example, this can be accomplished by measuring one or more of other process parameters including but not limited to process water temperature, electrode temperatures, electrode voltages, electrode current densities, water pressure, vapor pressure (e.g., in a vapor phase in the vessel 58), cumulative readings and values determined over time for any of the above or other measured system parameters, elapsed time of operation, and comparing such parameters against empirical oxygen content data (e.g., a look-up table) to determine an inferred dissolved oxygen concentration. A sensor 31 is shown in FIG. 9 disposed in the flow path 26', and can represent one or more sensors at the location shown or elsewhere in the system to measure any one or more of the above-mentioned or other parameters. For the sake of discussion below, the sensor 31 may be referred to as measuring for a concentration of dissolved oxygen in the process water, process water temperature, gas temperature, and pressure including gas pressure or liquid pressure. The sensors represented by sensor 31 can be located as shown in FIG. 9 at or immediately upstream of the membrane separator 58. Other sensor locations can be utilized. For example, a dissolved oxygen sensor and/or temperature sensor could be disposed in the liquid space in reservoir 28'. Process water temperature and pressure can be measured at any of a number of potential locations such as at the anode flow path outlet, or upstream and/or downstream of the pump 34, or upstream and/or downstream of the flow control valve 30, or anywhere along either or both of the cathode fluid flow path 23 or the anode fluid flow path 25.

As mentioned above, the solubility of oxygen in water varies inversely with temperature, and in some embodiments the system can be controlled to add heat to the process water to promote dissolution and evolution of gas phase oxygen so that it can be separated and removed. In some embodiments, the process water can be contacted with a heat source upstream of a liquid-gas separator. A separate heat source can be used, such as a heater or a heat exchanger with a heat rejection side in fluid and/or thermal communication with a heat source. The heat source can also be the electrochemical cell/stack 10 itself. The enthalpy of the chemical reactions resulting from electrolytic generation of inert gas occurring on each side of the separator 12 are balanced, with water molecules being split on the anode side and atoms combined to form water on the cathode side. Accordingly, the electrical energy entered into the system results in generation of heat. Disposition of the gas outlet 60 in the flow path 26' downstream of the cell/stack 10 allows for heat generated by the cell/stack 10 to promote evolution of oxygen for separation and removal from the process water. Continual addition of heat into the system to promote oxygen removal could cause heat to accumulate in the system, and thermal management of the system can be accomplished with various protocols. For example, in some embodiments, heat can be dissipated into a volume of water such as the reservoir 28' without increasing process water temperatures outside of normal parameters during a projected duration of system operation. However, in situations where the reservoir 28' cannot absorb process heat within tolerances, a heat exchanger can be included in the system as shown in FIG. 7 with heat exchanger 38. The heat exchanger 38 can provide cooling from a heat sink along the heat transfer flow path 40 (e.g., RAM air, a refrigerant from a cooling system such as a vapor compression cooling system). Multiple heat exchangers can also be used.

In some embodiments, the electrochemical cell stack 10' can be controlled to operate at parameters that provide a temperature at or upstream of a liquid-gas separator that is sufficient to produce a target dissolved oxygen level (as used herein, the terms upstream and downstream are defined as a position in a single iteration of the flow loop that begins and ends with the electrochemical cell stack 10'). In some embodiments, however, it may be desirable to operate the electrochemical cell stack at temperatures below that at which sufficient levels of dissolved oxygen are desolubilized. In such cases, a separate heater or heat exchanger can be included in the system, such as heater/exchanger 35 as shown in FIG. 10. The configuration of FIG. 10 can provide added heat from heater/exchanger 35 upstream of the vessel 58, and the added heat can be dissipated into a heat sink such as reservoir 28' or can be removed with a heat exchanger such as heat exchanger 38. Alternatively, or in addition to the use of a heater/exchanger 35 to add heat to the system, in some embodiments the electrochemical cell stack can be operated temporarily at a higher temperature during an oxygen-removal cycle, and then returned to operate at a lower temperature after completion of the oxygen-removal cycle.

Pressure management can also be utilized for promotion of evolution of gaseous oxygen from dissolved oxygen. For example, the placement of the control valve 30 upstream of the liquid-gas-separator can provide a reduction in pressure that can promote evolving of oxygen for removal from the process water. Output pressure of the pump 34 can also modify pressure to promote oxygen evolution.

In some embodiments, the process water can be heated using the pump and a pressure regulator. The pump performs mechanical work on the process water to actively heat it. In this way, the pump and pressure regulator serve as a heating element. Those skilled in the art will readily appreciate that in accordance with the First Law of Thermodynamics, the work performed on the process water elevates the internal energy of said fluid. In addition, in some embodiments the process water may also remove waste heat from the pump (e.g. bearings, motor drive, etc.). Those skilled in the art will readily appreciate that the work imparted to a fluid results from the change in the pressure and the change in volume of the fluid.

A flow rate of the process water through the electrochemical cell can be regulated by controlling the speed of the pump 34 or with a pressure regulator (not shown) along the process water flow path (e.g., 26'). Control of process water temperature based on output from a temperature sensor (not shown) along the anode fluid flow path 25 (and/or a temperature sensor along the cathode fluid flow path 23) can be accomplished, for example, by controlling the flow of process water through the heat exchanger 38 (e.g., by controlling the speed of the pump 34 or by diverting a controllable portion of the output flow of the pump 34 through a bypass around the heat exchanger 38 with control valves (not shown)) or by controlling the flow of a heat transfer fluid through the heat exchanger 38 along the flow path represented by 40.

It should be noted that system configurations shown in FIGS. 9-10 represent example embodiments, and that changes and modifications are contemplated. For example, in some embodiments a heat source (including the electrochemical cell or stack ("stack"), or a separate heat source) can be disposed upstream of the membrane ("membrane"), which can be disposed upstream of a heat-absorbing heat exchanger ("HX") in thermal communication with a heat sink. Such embodiments can provide a technical benefit of adding heat to promote evolution of gas from gas dissolved in the process water, and subsequent removal of such added heat from the process water. Examples of configurations of components include but are not limited to stack→heat source→membrane→HX, heat source→stack→membrane→HX, stack→membrane→HX.

Figure 11:
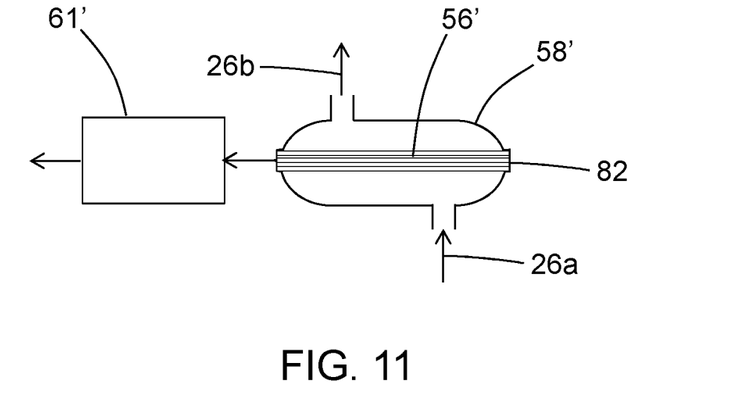
FIG. 11 is a schematic illustration of a tubular membrane separator.

It is further noted that although the aspects shown in FIGS. 3-10 depict the membrane 56 as a planar structure in part for ease of illustration, tubular membranes can also be used and can provide technical benefits including stability of the hollow tube structure to withstand stress from pressure differentials across the membrane such as from an applied vacuum on one side of the membrane. An example embodiment of a tubular membrane separator 58' is shown in FIG. 11. The tubular membrane separator 58' includes a plurality of hollow polymer tubular membranes 56' fluidly connected to a gas space 61', which can provide a pressure differential such as with a vacuum pump, ejector, or ambient atmosphere at high altitude as described above. The tubular membranes 56' can be sealed at end 82 for vacuum operation or they can include openings to allow air or other fluid flow as a sweep gas through the hollow tubular membranes 56' during operation. During operation, process water enters the separator 58' at inlet 26a and contacts exterior surfaces of the hollow polymer tubular membranes 56'. A pressure differential or equilibrium concentration differential drives gas from the process water on the outside to the hollow interior of the hollow polymer tubular membranes 56' from where they are discharged to gas discharge space 61'

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inerting gas to a protected space, comprising:
   a process water source;
   an electrochemical cell comprising a cathode and an anode separated by a separator comprising a proton transfer medium;
   a power source arranged to provide a voltage differential between the anode and the cathode;
   a cathode fluid flow path in operative fluid communication with the cathode between a cathode fluid flow path inlet and a cathode fluid flow path outlet;
   an anode fluid flow path in operative fluid communication with the anode, between an anode fluid flow path inlet and an anode fluid flow path outlet, the anode fluid flow path connected to the process water source;
   a cathode supply fluid flow path between an air source and the cathode fluid flow path inlet, and an inerting gas flow path in operative fluid communication with the cathode fluid flow path outlet and the protected space;
   an anode supply fluid flow path between a process water source and the anode fluid flow path inlet;
   a process water fluid flow path in operative fluid communication with the anode fluid flow path inlet and the anode fluid flow path outlet; and
   a membrane separator disposed in the process water fluid flow path and connected to anode fluid flow path outlet and provides water with oxygen removed from it to the anode fluid flow path inlet, the membrane separator including:
   a membrane including a first side in operative fluid communication with the process water fluid flow path and a second side in operative fluid communication with a first gas outlet.

2. The system of claim 1, wherein a fluid pressure on the second side of the membrane is lower than a fluid pressure on the first side of the membrane.

3. The system of claim 2, further including a vacuum pump in operative fluid communication with the second side of the membrane.

4. The system of claim 3, wherein the vacuum pump is an oil-free vacuum pump.

5. The system of claim 3, wherein the vacuum pump is a diaphragm vacuum pump, a rocking piston vacuum pump, a scroll vacuum pump, a roots vacuum pump, a parallel screw vacuum pump, a claw type vacuum pump, or a rotary vane vacuum pump.

6. The system of claim 2, further including an ejector suction port in operative fluid communication with the second side of the membrane.

7. The system of claim 2, wherein the pressure on the second side of the membrane is provided by a fluid connection operable to provide fluid communication with ambient air at an altitude greater than 10,000 feet above sea level.

8. The system of claim 1, further comprising a sweep gas flow path on the second side of the membrane in operative fluid communication with a source of a sweep gas.

9. The system of claim 1, wherein the membrane includes a micro-porous structure with pore or path sizes configured to have greater permeability to gas molecules than to water molecules.

10. The system of claim 1, wherein the membrane includes a polymer configured to have greater affinity with gas molecules than water molecules.

11. The system of claim 1, further comprising a liquid-gas separator on the process water fluid flow path, wherein the liquid-gas separator includes an inlet and a liquid outlet each in operative fluid communication with the process water fluid flow path, and a second gas outlet.

12. The system of claim 1, further comprising a heater or a first heat exchanger including a heat absorption side in operative fluid communication with the process water fluid flow path.

13. The system of claim 12, further comprising a second heat exchanger including a heat rejection side in operative fluid communication with the process water fluid flow path and a heat absorption side in operative thermal communication with a heat sink.

14. The system of claim 1, comprising a plurality of said electrochemical cells in a stack separated by electrically-conductive fluid flow separators.

15. The system of claim 1, further comprising:
   a sensor configured to directly or indirectly measure dissolved oxygen content of process water that enters the membrane separator;
   a controller configured to provide a target response of the sensor through operation and control of fluid conditions at the membrane.

* * * * *